United States Patent [19]

Wada et al.

[11] Patent Number: 4,695,882

[45] Date of Patent: Sep. 22, 1987

[54] MOVEMENT ESTIMATION SYSTEM FOR VIDEO SIGNALS USING A RECURSIVE GRADIENT METHOD

[75] Inventors: Masahiro Wada; Hirohisa Yamaguchi, both of Tokyo, Japan

[73] Assignee: Kokusai Denshin Denwa Co., Ltd., Tokyo, Japan

[21] Appl. No.: 696,371

[22] Filed: Jan. 30, 1985

[30] Foreign Application Priority Data

Jan. 30, 1984 [JP] Japan .................................. 59-13501

[51] Int. Cl.$^4$ .......................... H04N 7/12; H04N 7/18
[52] U.S. Cl. .................................. 358/136; 358/105; 358/138
[58] Field of Search ............... 358/105, 133, 135, 136, 358/138; 375/27

[56] References Cited

U.S. PATENT DOCUMENTS 4,218,703  8/1980  Netravali et al. .................... 358/136
4,232,338  11/1980  Netravali et al. .................... 358/136
4,383,272  5/1983  Netravali et al. ................. 358/105 X

OTHER PUBLICATIONS

"Motion–Compensated Television Coding", part 1, The Bell System Technical Journal, vol. 58, No. 3, Mar. 1979, pp. 631–635.

"Estimating the Velocity of Moving Images in Television Signals", Limb, et al., Computer Graphics and Image Processing, (1975), 4, pp. 311–327.

Primary Examiner—E. A. Goldberg
Assistant Examiner—Patrick W. Foster
Attorney, Agent, or Firm—Armstrong, Nikaido, Marmelstein & Kubovcik

[57] ABSTRACT

A movement of a small picture block in a frame of video signals is provided by recursively applying a gradient method to a picture block in a present frame and a preceding frame to provide a series of sub-movements until said sub-movement decreases less than a predetermined value, and the resultant movement is obtained by the sum of the sub-movements. The present invention provides high accuracy in estimation of movement of a block in a picture as compared with a conventional gradient method, and is attractive in hardware implementation.

4 Claims, 3 Drawing Figures

MOVEMENT ESTIMATION SYSTEM FOR VIDEO SIGNALS USING A RECURSIVE GRADIENT METHOD

BACKGROUND OF THE INVENTION

The present invention relates to a method for measuring the amount of movement of video signals, like television signals. The present invention uses the gradient method which has the advantage of effective hardware implementation, and the present invention uses that gradient method repetitively. The present invention is applicable to a high efficiency coding system of video signals which compensates picture movement between frames, and/or a frame rate conversion in a television system.

A conventional frame rate conversion system of a television signal between NTSC and PAL, or SECAM has the disadvantage that the converted picture blurs when the picture moves, because the conversion is carried out through interpolation between two succesive frames. The quality of a converted picture would be improved by using interpolation which counts for the displacement of a picture.

The picture coding which compensates a picture movement has been recently developed and for that purpose, the measurement of the amount of movement of a picture is requested.

Some of conventional measurement systems for that purpose are; (1) Pourier transform method; (2) A method which provides the amount of movement by the displacement which provides the maximum mutual correlation coefficients; (3) A matching method which provides the amount of movement by the displacement which provides the minimum difference between frames or fields; and (4) A gradient method which provides the displacement based on the relation between the spatial gradient of intensity of a picture and the difference between frames or fields.

Among them, the first three methods have the disadvantage that a lot of calculation is necessary and the hardware implementation is difficult. The fourth method can be implemented easily in hardware but it has the disadvantage in the accuracy of the measurement obtained.

A prior gradient method is shown in "Motion Compensated Television Coding" Part 1, in The Bell System Technical Journal, vol 58, No. 3, March 1979, pages 631–635, and in "Estimating the Velocity of Moving Images in Television Signals" in Computer Graphics and Image Processing (1975) 4, pages 311–327.

The prior gradient method discussed in the above citations is described in detail below.

First, a simple linear movement of one dimension is described in accordance with FIG. 1, in which the horizontal axis shows a position, and the vertical axis shows an intensity. It is assumed that the intensity of each picture element in a preceding frame is shown in the curve (a), and the intensity of the same in the present frame is shown in the curve (b). In that case, the symbol (d) shows the frame difference which is the difference of intensity between frames, the angle (A) shows the gradient of the intensity, and the symbol (v) shows the displacement of a picture between frames. It should be noted in FIG. 1 that the displacement (v) is expressed by $v = -d/(\tan A)$. Accordingly, the displacement or the amount of movement is obtained by measuring an intensity difference between frames, and an intensity gradient.

Next, a displacement of two-dimension.

It is assumed that a picture $I(x,y)$ moves by the movement vector $\alpha = (a,b)$ in one frame period, and becomes $I(x-a, y-b)$. When $\alpha$ is small, the Taylor series of the primary term is shown below.

$$a(\partial I/\partial x) + b(\partial I/\partial y) = -d(x,y) \tag{1}$$

where $d(x,y)$ is difference between frames. The equation (1) is expressed as follows.

$$\alpha \cdot \mathrm{grad}\, I = -d(x,y) \tag{2}$$

To solve the equation (2) for the components (a) and (b) of the movement vector ($\alpha$) under the minimum square-error condition, the followings are obtained.

$$a = -\Sigma \Delta X \Delta T / \Sigma \Delta X^2 \tag{3}$$

$$b = -\Sigma \Delta Y \Delta T / \Sigma \Delta Y^2 \tag{4}$$

where $\Delta X$, $\Delta Y$, and $\Delta T$ represents $\partial I/\partial x$, $\partial I/\partial y$, and $d(x,y)$, respectively, and the following equation which is good for most pictures is assumed.

$$\Sigma \Delta X \Delta Y = 0 \tag{5}$$

The equations (3) and (4) are approximately as follows.

$$a = -\Sigma \Delta T \,\mathrm{sign}(\Delta X)/\Sigma |\Delta X| \tag{6}$$

$$b = -\Sigma \Delta T \,\mathrm{sign}(\Delta Y)/\Sigma |\Delta Y| \tag{7}$$

The values (a) and (b) are outputs of the measured movement. In the equations (6) and (7), $\Delta T$ is the difference between frames, $\Delta X$ is the horizontal intensity gradient, $\Delta Y$ is the vertical intensity gradient, $\Sigma |\Delta X|$ is the sum of the absolute of the horizontal intensity gradient of all the picture elements in a block, $\Sigma |\Delta Y|$ is the sum of the absolute of the vertical intensity gradient of all the picture elements in a block.

The conventional gradient method measures the displacement merely by addition, sign calculation, and a single division according to the equations (6) and (7), therefore, that gradient method can be implemented easily by conventional hardware.

However, the prior gradient method has the disadvantage that the accuracy of the measurement is poor, because of the presumption of the equation (1) which presumes that the movement vector ($\alpha$) is small, the presumption of the equation (5), and the approximation of the equations (6) and (7). In particular, the accuracy is poor when the movement is large. The accuracy of the prior gradient method depends upon the size of a picture block used for measurement. When the block is large, the accuracy is improved because characteristic parts in a picture can easily be recognized, and the relative amount of movement as compared with the size of the block is small. On the contrary, when the block is small, the accuracy is poor.

Accordingly, in the conventional gradient method, in order to improve the accuracy for a large movement, an extremely large block must be used. However, the use of such large blocks results in the disadvantages that a fine movement can not be measured, and a large number of calculations are necessary.

SUMMARY OF THE INVENTION

It is an object of the present invention to overcome the disadvantages and limitations of the prior movement estimation system by providing a new and improved movement estimation system.

It is also an object of the present invention to provide a movement estimation system which can be implemented by simple hardware, and has excellent estimation accuracy even when a movement is large.

The above and other objects are attained by a movement estimation system for a video signal using a gradient method which estimates the movement between a present frame and a preceding frame based on the relations between spatial gradient of the signal and temporal difference between the present frame and proceding frame; comprising a buffer memory for storing a video signal of the present block, a frame memory for storing a video signal of preceding frame, a movement calculator for providing estimation of movement of a picture block the gradient method using contents in said buffer memory and said frame memory, a vector adder for accumulating outputs of said movement calculator, a convergence sensor for continuing and/or stopping said movement calculator upon detection that output of said movement calculator is larger or less than a predetermined value, wherein the gradient method is carried out repetitively to provide a series of sub-movements which is provided by said movement calculator until a sub-movement gets equal to or less than a predetermined value, a first sub-movement V1 is obtained using a block (B) in a present frame and a block (B'1) in a preceding frame in FIG. 2, a second sub-movement V2 is obtained using said block (B) and a block (B'2) shifted by said first movement (V1) in the preceding frame, i'th sub-movement (i is an integer) is obtained using said block (B) and a block shifted by preceding sub-movements in the preceding frame, and the resultant movement (V) is given as the sum ($V=V1+V2+\cdots$) of each of said sub-movements.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENT

Figure 1:
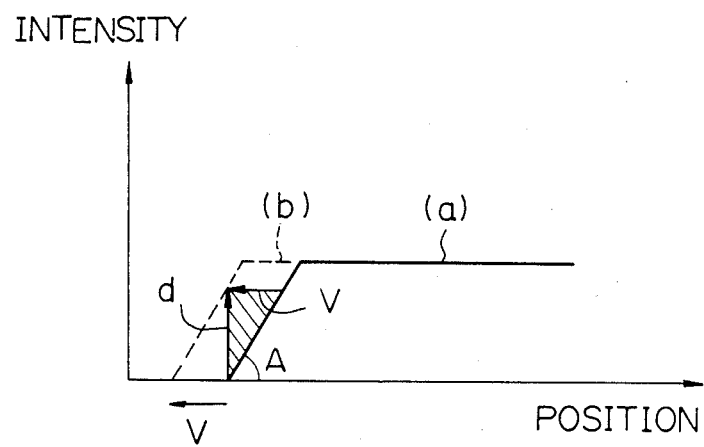
FIG. 1 shows the explanatory drawing of a gradient method of one-dimension.
Figure 2:
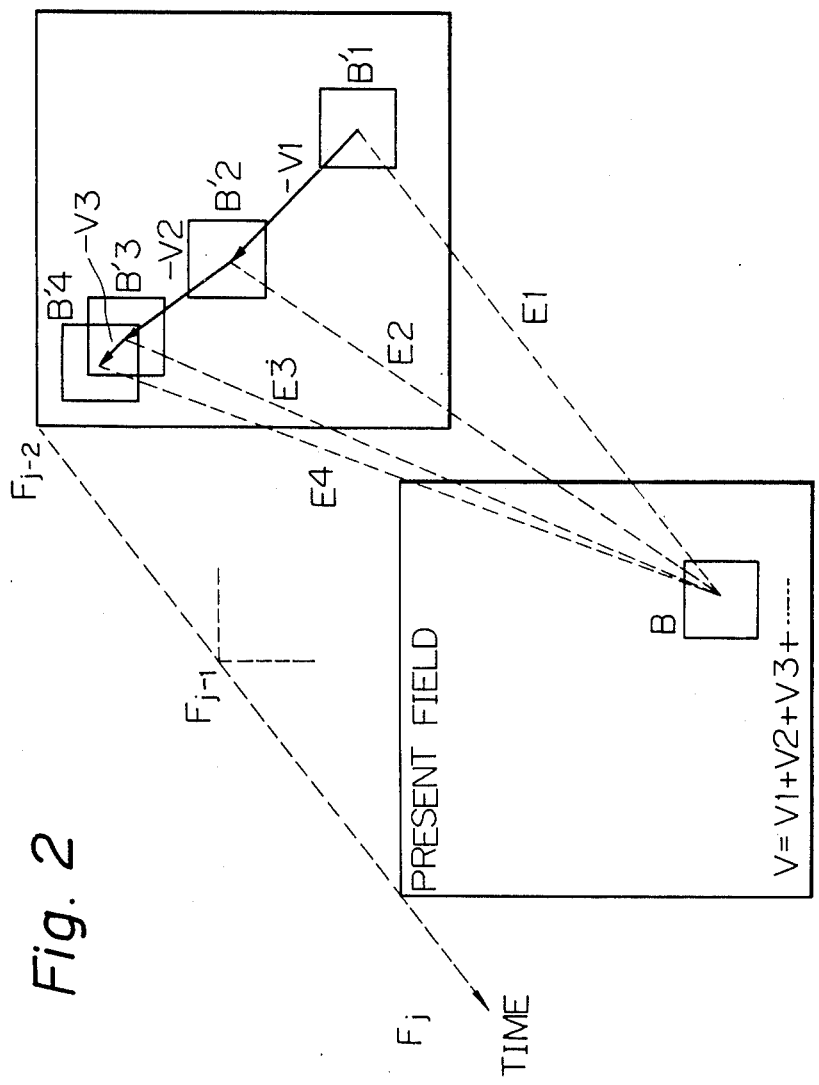
FIG. 2 shows the operational principle of the present invention.

The basic idea of the present invention is first described in accordance with FIG. 2. According to the present invention, the primary estimate v1 of the displacement is obtained by the gradient method between the picture block B in the present field $F_j$ (or frame) and the block B'1 which locates at the same position as the block B in the twice previous field $F_{j-2}$ (or the previous frame) (step E1). Next, using said first estimate v1, the block B'2 which is shifted by $-v1$ from the first block B'1 is obtained, and the second approximation v2 is calculated between the block B and the block B'2 in the two previous field $F_{j-2}$ (step E2). Similarly, the higher order estimates are calculated in similar manner, and the final estimation v is shown as follows.

$$v = v1 + v2 + v3 + \ldots \qquad (8)$$

It should be appreciated that the prior gradient method omits the terms higher than second term (v2) in the equation (8). That is to say, the final output by the prior gradient method is v1.

The size of a block (B, B'1, B'2, et al) in the present embodiment is preferably, for example, 16 picture elements in the horizontal direction, and 8 picture element in the vertical direction (16×8).

The calculation of the equation (8) stops when $v_i$ (i=1,2,3 ...) becomes smaller than a predetermined value as shown in the equation (9).

$$\| v_i \| < \epsilon \qquad (9)$$

where $\| \; \|$ shows the norm of a vector, and ($\epsilon$) is a small threshold. When the condition of (9) is satisfied at teh i'th repetition, the approximation stops at that repetition.

When the minimum unit of the movement is supposedas the distance between neighboring picture cells, (9) is shown below.

$$|v_{ix}| \leq 0.5, \text{ and } |v_{iy}| \leq 0.5 \qquad (10)$$

where $v_{ix}$ (=a) and $v_{iy}$ (=b) are the horizontal component of $v_i$ and the vertical component $v_i$ in the equation (8). When (9) or (10) is not satisfied after the reasonable number of repetition of estimation, the allowable upper limit number for the repetition is introduced, and the calculation stops at that upper limit. That upper limit of the repetition is for instance five times.

In the above explanation, it is assumed that the initial movement before the first estimate is zero and the estimation starts using the present block B and the block B'1 at the same location in the previous frame. In the present invention, however, the initial shift, initial movement vector can also be used. In such case as using the initial shift, the first estimate starts using the present block B and the block B'1 which is shifted by the initial movement vector in the previous field.

Figure 3:
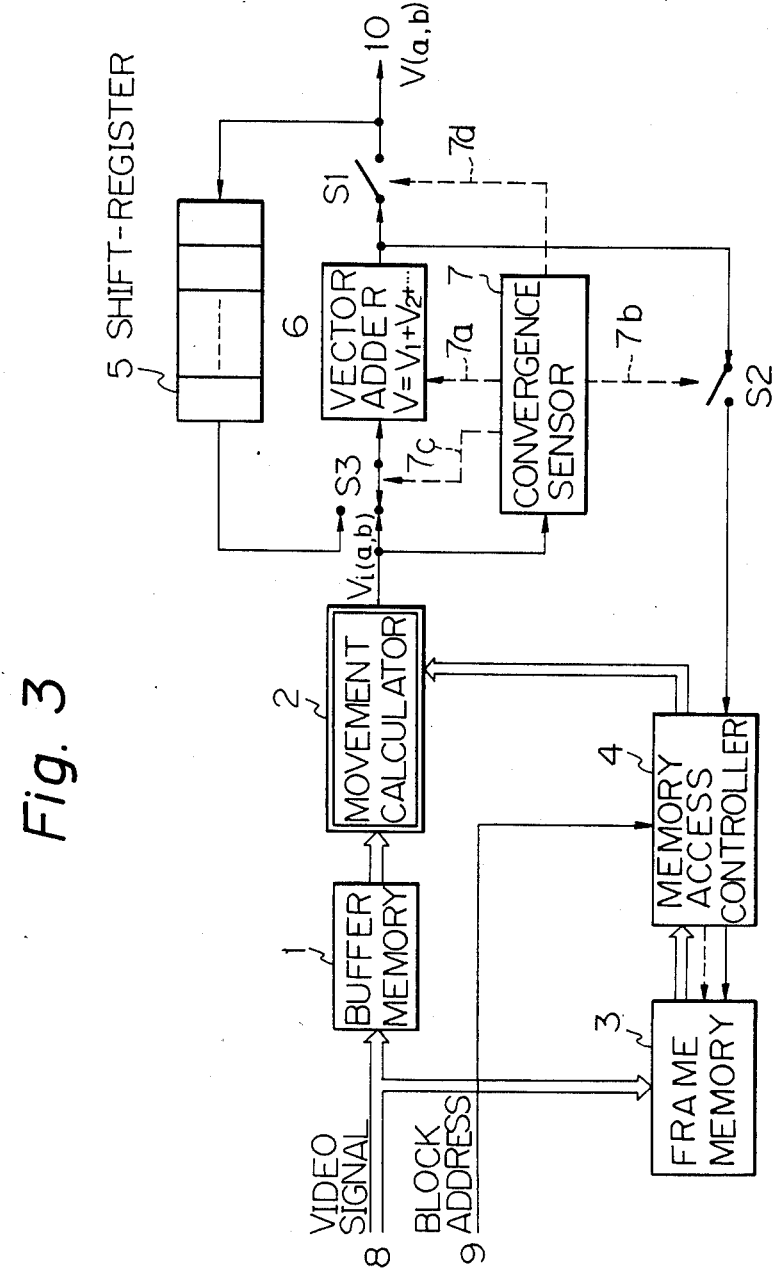
FIG. 3 is a block diagram of the movement measurement apparatus according to the present invention.

FIG. 3 shows blockdiagram of a hardware for implementing the principle of FIG. 2. In FIG. 3, the numeral 1 is a buffer memory for storing a video signal of the present block, 2 is a movement calculator by the conventional gradient method, 3 is a frame memory for storing a video signal of a previous frame, 4 is a memory access controller for addressing the frame memory 3, 6 is a shift register, 6 is a vector adder, 7 is a convergence sensor, 8 is a video signal input, 9 is a block address input, and 10 is an output of an estimated movement vector. The dotted line in FIG. 3 shows the control signal, the solid line shows the information of displacement or movement, and the thick arrows show the flow of a video signal.

In operation, it can be assumed that the initial movement in the repetition is zero. That is to say, the block B'1 is at the same location in the previous frame as the block B in the present frame in FIG. 2. In that case, the shift register 6 and the switch S3 in FIG. 3 can be omitted. The vector adder 6 is first initiated to zero by the convergence sensor 7 through the line 7a before the estimation of each block.

Then, the switch S2 is closed by the convergence sensor 7 through the line 7b, and the memory access controller 4 is initiated. The memory access controller 4 decides the location of the block to be read out in the previous frame (in the present embodiment, the initial movement is zero) using the input block address information which is the displacement of the block and supplied through the line 9 from an external circuit (not shown) and the movement vector from the vector adder 6. The video signals of the present block in the buffer memory 1 and the previous block thus picked up is applied to the movement calculator 2, which calculates the amount of the movement between the present block (B in FIG. 2) and the block (B′1) in the previous frame. The result V1 of the calculation of the movement is applied to the vector adder 6 and the convergence sensor 7. The movement calculator 2 provides the movement V1 which is estimated using the blocks B and B′1, the movement V2 using the blocks B and B′2, et al, and the vector adder 6 provides the sum $V(=V1+V2+V3+\cdots)$ for each time. The convergence sensor 7 measures if the movement provided by the movement calculator 2 is equal to or less than the predetermined value, and when that condition is satisfied, the sensor 7 closes the switch S1 through the control of the line 7d so that the content of the vector adder 6 is output as the measured movement (V). When the movement calculated by the calculator 2 is still larger than the predetermined value, the sensor 7 recognizes that the calculation must continue, and closes the switch S2 so that the content of the vector adder 6 is applied to the memory access controller 4 for the next step of calculation.

Which the output of the calculator 2 does not become smaller than the predetermined small value after the predetermined number of calculation times (for instance, five times), the convergence sensor 7 stops the calculation.

When the estimation for the block finishes, a video signal of the next block and next address of block is supplied through the line 8 and 9, respectively, and the estimation for the new block is carried out in the same algorithm.

By repeating the above operation, the calculation of all the blocks which cover the whole area of the present frame is accomplished.

The above embodiment has the assumption that the initial block B′1 locates at the same location in the previous frame as that of the block B in the present frame. In case that the movement could be estimated roughly before the calculation for the block, that estimated displacement can be used for the initial location of B′1 so that the calculation becomes easier. In that case, the initial displacement is not zero.

When the initial displacement is not zero, the initial displacement for each block has been stored in each cell of the register 5, the content of which is applied to the vector adder 6 as the initial value of the vector adder 6 through the switch S3 at the initial stage of the calculation for each block. The switch S3 is controlled by the convergence sensor 7 through the line 7c. In that case, the vector adder is initiated not to zero, but to the output of the shift register 5. The shift register 5 stores the estimation movement of each block as the initial displacement for the following block, and therefore, each cell of the register 5 has preferably 2 bytes of capacity for each block. The number of cells requested for the register 5 is the same as the number of the blocks in a frame. Therefore, when the number of the blocks is 20,000, the capacity of the shift register 5 is 2 (bytes)×20000=40 kilo-bytes, which can be implemented simply. It should be noted that the shift register 5 is read out only once for block, and therefore, the operational speed of the register 5 need not be so high.

The movement calculator 2 may which estimates the movement by the gradient method be a conventional one which has a sign (plus/minus) sensor, several adders and some dividers. As the present invention can perform the calculation repetitively, the calculation speed of the calculator 2 must be several times as fast as the conventional one, and it should be appreciated that the calculator for the present invention with such high calculation speed may be obtained easily.

As described above in detail, the present invention improves the conventional gradient method, in particular, when the amount of movement is large, or a block size has to be small, the present invention is effective. It should be noted in particular that the present invention can be implemented by the use of simple hardware.

From the foregoing it will now be apparent that a new and improved movement estimation system for video signals has been found. It should be understood of course that the embodiment disclosed is merely illustrative and is not intended to limit the scope of the invention. Reference should be made to the appended claims, therefore, rather than the specification as indicating the scope of the invention.

What is claimed is:

1. A movement estimation system for a video signal using a gradient method which estimates movement of a picture block between a present frame and a preceding frame based on the relations of a spatial gradient of a video signal in a frame and difference between present frame and preceding frame; said system comprising:

a buffer memory for storing a video signal of present frame;

a frame memory for storing a video signal of preceding frame;

a movement calculator for providing estimation of movement of a block in a picture using contents in said buffer memory and said frame memory;

a factor adder for accumulating output of said movement calculator; and a convergence sensor for continuing and/or stopping said movement calculator upon detection that output of said movement calculator is larger or less than a predetermined value, such that a gradient method is carried out interatively to provide a series of sub-movements which are provided by said movement calculator until a sub-movement V1 is obtained between a block (B) in a present frame and a block (B′1) in a preceding frame, a second sub-movement V2 is obtained between said block (B) and a block (B′2) defined by said first movement (V1) in the preceding frame, i'th sub-movement, when I is an integer, is obtained between said block (B) and a block defined by preceding sub-movements in the preceding frame, and resultant movement (V) is given as the sum $(V=V1+V2+\cdots)$ of each of said sub-movements.

2. A movement estimation system according to claim 1, wherein said vector adder is initialized to zero so that said block B′1 used for providing a first sub-movement V1 resides at the same location in a preceding frame as the block B in a present frame.

3. A movement estimation system according to claim 1, further comprising a shift register for storing an estimated vector which is used for initializing vector adder to the initial displacement.

4. A movement estimation system according to claim 1, wherein said convergence sensor has a counter for stopping said movement calculator when calculation of sub-movements is repeated a predetermined number of times.

* * * * *